United States Patent [19]

Ebert, Jr. et al.

[11] Patent Number: 4,633,412
[45] Date of Patent: Dec. 30, 1986

[54] OPTION PROTOCOL ARRANGEMENT FOR STORED PROGRAM RECTIFIER CONTROLLER

[75] Inventors: Harry K. Ebert, Jr., Whippany; Henry E. Menkes, Montville; Thomas V. Papathomas, Madison; Chitra R. Venkatram, Morris Township, Morris County, all of N.J.

[73] Assignee: AT&T Bell Laboratories, Murray Hill, N.J.

[21] Appl. No.: 604,042

[22] Filed: Apr. 26, 1984

[51] Int. Cl.[4] .................... G05B 19/02; G06F 15/46; H02M 7/08
[52] U.S. Cl. .................... 364/493; 307/43; 364/492; 363/69
[58] Field of Search .................... 364/200, 900, 492, 493; 307/43, 48, 66, 87; 363/69, 70, 75, 81

[56] References Cited

U.S. PATENT DOCUMENTS

| | | | |
|---|---|---|---|
| 4,363,097 | 12/1982 | Amano et al. | 364/900 X |
| 4,418,382 | 11/1983 | Larson et al. | 364/200 |
| 4,439,839 | 3/1984 | Kneib et al. | 364/900 |
| 4,451,773 | 5/1984 | Papathomas et al. | 307/48 X |
| 4,475,047 | 10/1984 | Ebert, Jr. | 364/492 X |

OTHER PUBLICATIONS

Woods et al: A Multi-Microcomputer Based Distributed Front End Communications Subsystem for a Power Control Center, IEEE Transactions for Power Apparatus and System, vol. PAS-101, No. 1 (Jan. 1982), pp. 180-184.
Papathomas et al.: Stored-Program Control of DC Power Plants, Intelec 81, Papathomas et al.: Stored--Program Control of DC Power Plants, Intelec 81, Third International Telecommunications Energy Conference, London, England, May 1981, pp. 18-23.

Primary Examiner—Felix D. Gruber
Attorney, Agent, or Firm—Alfred G. Steinmetz

[57] ABSTRACT

A rectifier plant control system includes a stored program of a master control to control operation and monitor rectifier plant conditions. The master control is designed to cooperate with optional control systems to accomplish new operations without requiring modifications to the stored program control of the master control. One such optional control system permits accessing the master control from a remote location.

The optional control system includes an associated stored program which is utilized by the master control to accomplish the option. This associated stored program is in an address field of the stored program of the master control and is executed by the master control.

9 Claims, 6 Drawing Figures

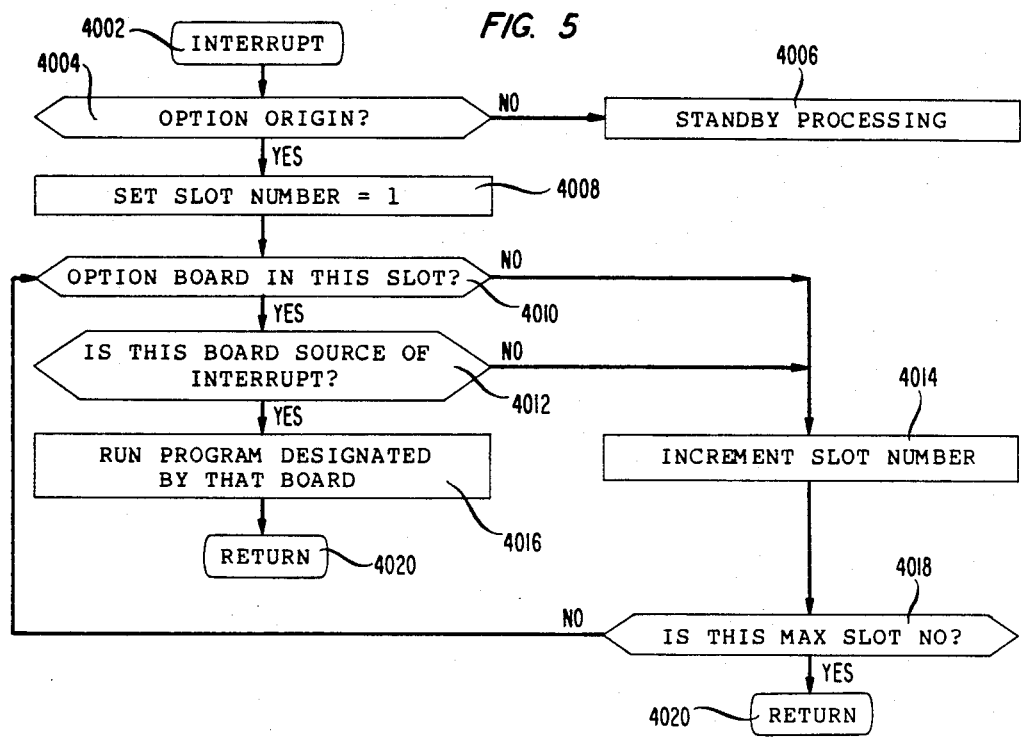

```
ENTER PASSWORD

TYPE 'MENU' FOR LIST OF COMMANDS
YOU ARE NOW IN AN ACTIVE SESSION
              ALARMS
1 HIGH BATTERY VOLTAGE ALARM PRESENT
2 MAJOR FUSE OR BREAKER ALARM PRESENT
3 RECTIFIER EFFICIENCY ROUTINE DISABLED
4 LIMITED RECHARGE ALARM PRESENT
5 RECTIFIER ALARMS PRESENT
FOR CLARIFICATION, TYPE LINE NUMBER
MENU

MENU

ALMS         : LISTS ACTIVE ALARMS
VI           : GIVES BATT VOLTAGE & PLANT DRAIN
BD           : GIVES STATUS OF BATT DISCHARGE ALARM
HV           : GIVES STATUS OF HIGH VOLTAGE ALARM
FAJ          : GIVES STATUS OF MAJOR FUSES OR BREAKERS
EFF          : GIVES STATUS OF EFFICIENCY DISABLE ALARM
LIMR         : GIVES STATUS OF LIMITED RECHARGE ALARM
MN           : GIVES STATUS OF MINOR SYSTEM ALARMS
RECT         : GIVES STATUS OF RECTIFIERS
LOADST       : PRINTS LOAD STATISTICS
RCTDR        : PRINTS RECTIFIER DRAINS
MENU         : PRINTS LIST OF POSSIBLE COMMANDS
```

OPTION PROTOCOL ARRANGEMENT FOR STORED PROGRAM RECTIFIER CONTROLLER

TECHNICAL FIELD

This invention relates generally to a stored program control for a power system and, more specifically, to a stored program control system that readily permits additions of a plurality of options to a power control system without altering the primary stored program control.

BACKGROUND OF THE INVENTION

The functions of a power system operating under stored program control are directed by a system stored program that operates in real time and specifies the various operating and testing functions performed. This program known as firmware is normally stored in a type of memory called a ROM or EPROM memory device which is included in a microcomputer dedicated to the particular power system. Should it be desired to add new options or capabilities to the basic power system, the overall system stored program must be changed. This may be readily accomplished by substituting a new ROM device containing a new program in newly manufactured power systems; however, it is not accomplished so readily on already existing systems in the commercial marketplace that are not readily available for the insertion of new ROM memory devices.

The addition of new options by changing the primary stored programs may further be complicated by the fact that a modification or addition to one portion of the program may cause an inadvertent change in another portion of the program; thereby, converting a formerly flawlessly operating power system program into a bug ridden malfunctioning demon.

Since many features of a power supply system will be changed and added during the life of the product, it is desirable to provide for ready modification and addition of features or options without requiring changes to the original stored control program.

SUMMARY OF THE INVENTION

A power system having a stored program control is designed to accept additional control options without requiring modifications to the original stored program control. Added options are embodied in stored programs on separate control circuit boards which operate cooperatively with the original stored program control on a master control circuit board to provide the added option control.

Specifically, a stored program controlled plant controller operative for controlling a group of rectifiers under stored program control is designed to permit the addition of optional features at a subsequent time without requiring any modifications to be made to the stored program of the primary controller.

The primary stored program controller is programmed with instructions that respond to a specific type of interrupt to search for a substitute stored program control on a separate control circuit board to which program system control is to be temporarily transferred to. All options are individually embodied in separate option controller circuit boards whose stored program control instructions share a common address as viewed by the primary controller on the master control circuit board. The interrupt may be generated by an external request or through a separate option controller board itself. Upon the receipt of an interrupt, the primary controller program institutes a search to find the originating source and identify the appropriate option controller board and then transfer control to a stored program; thereon, to permit execution of the option.

BRIEF DESCRIPTION OF THE DRAWING

An understanding of the invention may be attained by reference to the following specification and the accompanying drawing in which:

FIGS. 4 and 5 show flow charts describing the operation of an illustrative stored program of the remote control option controller; and FIG. 6 shows a typical terminal display when operating a remote control option added to the primary controller.

DETAILED DESCRIPTION

Figure 1:
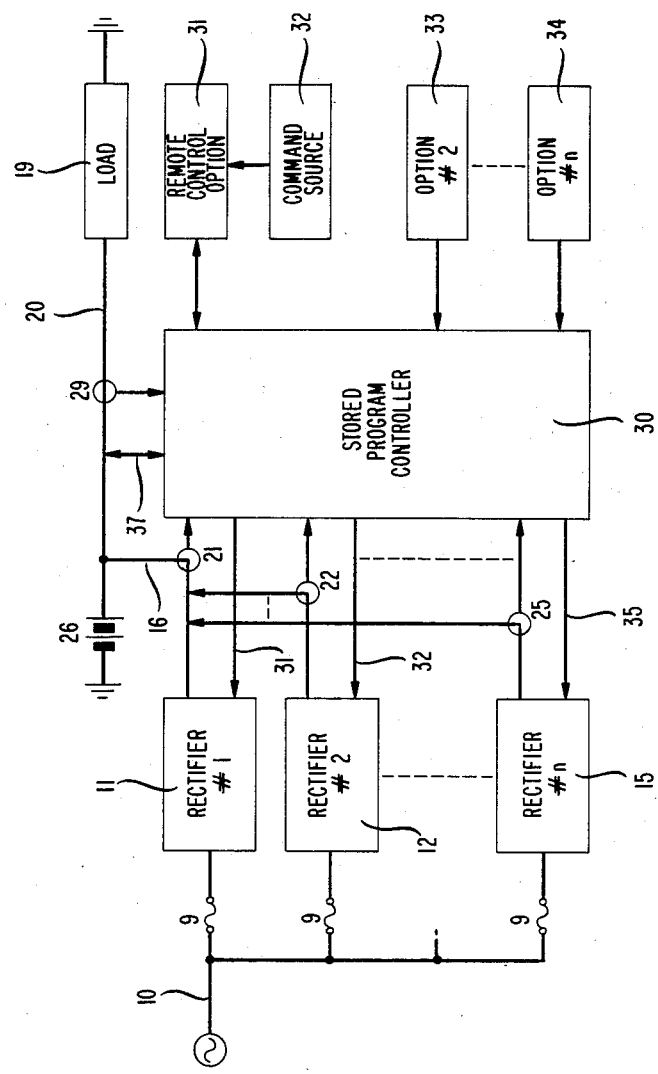
FIG. 1 is a block diagram of a rectifier system under stored program control.

A rectifier plant system operating under stored program control such as is shown in FIG. 1, is designed to evaluate current load requirements and determine which rectifiers of a plurality of rectifiers of various power ratings should be turned on and off in order to achieve the best possible overall system efficiency of operation. AC power from a utility is applied at input 10 and coupled, via the fuses 9, to individual rectifiers 11, 12 and 15. A plurality of rectifiers of various capacities exist between rectifiers 12 and 15 but are not specifically shown in order to simplify the drawing. The on/off state of the individual rectifiers as well as monitoring operational states and signals is under control of a stored program controller 30.

The output of the individual rectifiers 11, 12 and 15 are coupled, via a bus 16, to a battery 26 and, in turn, via bus 20, to a load 19. The stored program controller 30 is coupled to current sensors 21, 22 and 25 which individually monitor the current output of rectifiers 11, 12 and 15. The current of the additional rectifiers between 12 and 15 is likewise sensed (though these rectifiers are not specifically shown schematically in FIG. 1). The current supplied to the load is sensed by current sensor 29. The stored program controller 30 evaluates the various current levels and determines what rectifiers should be operative to achieve maximum efficiency or some other objective. Control signals to turn rectifiers on or off are supplied, via leads 31, 32 and 35, to the individual rectifiers. The stored program controller is also connected, via lead 37, to monitor battery voltage and the sensed signals are utilized to determine alarm and discharge conditions and the status of all system components.

The above described efficiency control arrangement represents a particular series of control features that can be achieved, via the medium of stored program control. It is desirable to have a "no frills" basic power system with the efficiency control and basic status monitoring, and yet, permit additinal specified options to be appended thereto, without rewriting the original stored program. It may be determined; subsequently, that new options are desirable after design of the basic stored program controller has been completed.

One such option may be a remote control arrangement which permits commands to be addressed to the stored program control from a distance. Such a remote control unit 31 could be accessed via a command source 32 which may comprise a telecommunications network. This remote control option is just one of many options that can be added, such as option 2 in box 33 up to option n in box 34 as shown in FIG. 1. These options must be compatible with both the stored program controller and with each other and any other optional feature which may be subsequently added.

Figure 2:
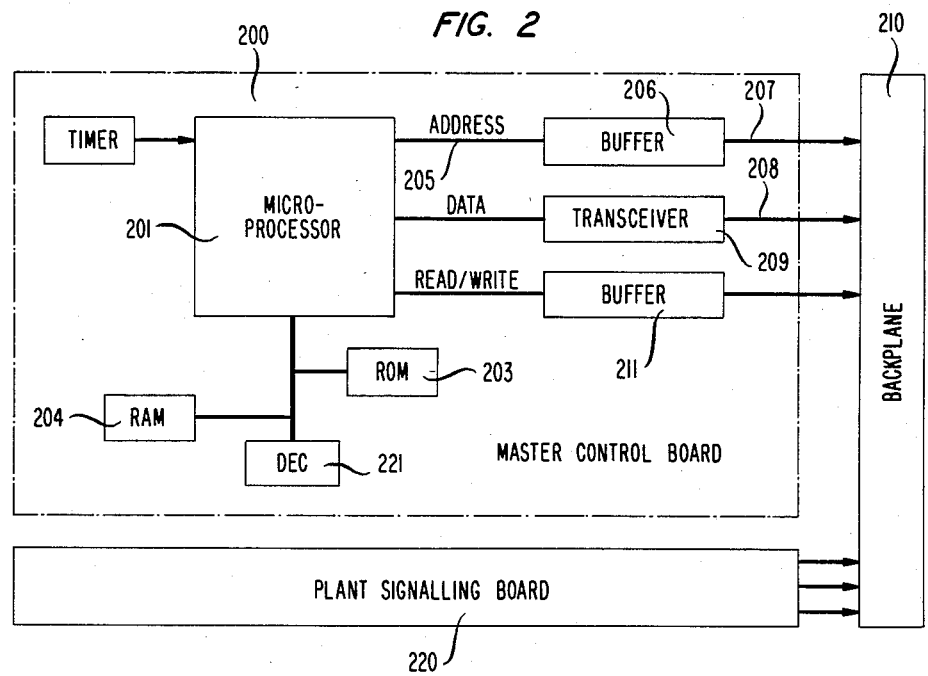
FIG. 2 is a block diagram of the primary or master stored program controller circuit.

A basic controller is contained in a master circuit board 200 as shown in FIG. 2 and provides the desired basic control functions described above for controlling the rectifier power system. This basic controller is designed to permit modular additions of new optional features to the control functions of the stored program control.

It includes a microprocessor 201 connected to a bus 202 which is, in turn, coupled to ROM and RAM memory chips 203 and 204 and to a decoder 221, all of which are contained on the master controller board 200. An address bus 205 is coupled to a buffer 206 which, in turn is connected, via line 207, to a backplane 210 of the housing in which the master controller board is mounted. The backplane 210 provides connectors to which any circuit boards may be connected and provide the leads by which one circuit board may interact with another circuit board. A data port of the microprocessor 201 to permit the sending and receiving of data is coupled to a transceiver 209 which is, in turn, also coupled via bus 208 to the backplane 210. Chip control signals such as read/write signals are also coupled, via buffer 211, to backplane 210.

A plant signaling board 220 is also connected to the backplane 210 and includes interface circuitry that permits the stored program of microprocessor 201 to interact with the plant system it is controlling. Since such circuitry is well known in the art, it is not disclosed in detail herein.

Figure 3:
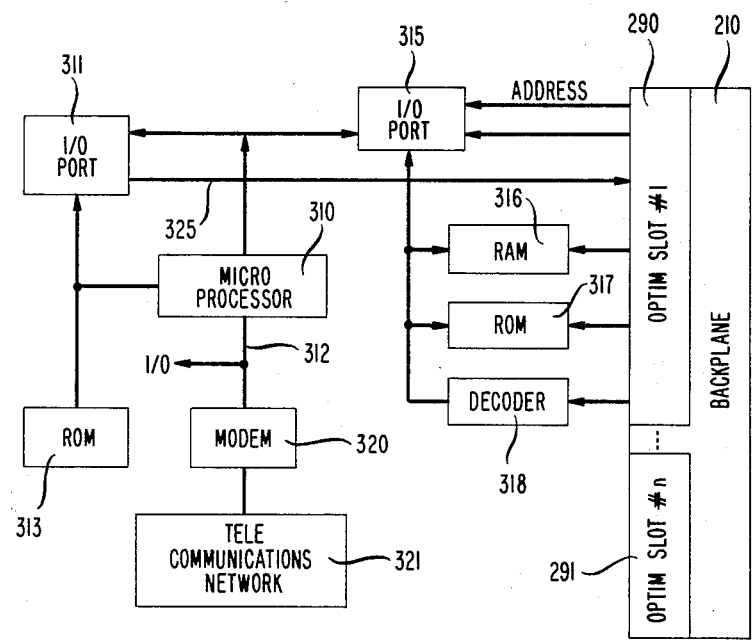
FIG. 3 is a block diagram of a remote option controller circuit that is selectively joined to the primary stored program controller circuit.

A particular option circuit board is shown connected to the backplane 210 in FIG. 3. It includes a microprocessor unit 310 and an associated input/output port 311 connected with that microprocessor. Microprocessor 310 is preferably a self contained computing unit such as INTEL'S 8751 microprocessor unit and; accordingly, has an input/output line 312 connected directly, thereto. Line 312 may be connected to a modem 320 to allow telecommunications between a remote location and the microprocessor 310. Added memory for stored program instructions is provided by the ROM memory device 313 connected to microprocessor 310.

The option circuit board also includes a second input/output port 315 which is associated with the microprocessor 201 of the master control board of FIG. 2 and is connected; thereto, via the backplane connection 210 which has designated option slots such as slot 290 to accept option circuit boards. The backplane 210 includes a plurality of option slots up to option slot 291 designated number n to which other option control boards can be connected. It is not necessary for a particular slot to be dedicated to a particular option board, an option board may be placed in *any* slot. A RAM memory device 316, a ROM memory device 317 and an address decoder 318 are also connected with the microprocessor 201 of the master control board, via the backplane 210. The ROM device 317 includes stored program instructions that are utilized by the microprocessor 201 of FIG. 2 to process a particular option as defined by these instructions.

The particular option illustrated herein is a remote option to allow someone to access and exercise control over the master control from a remote location through a telecommunications network. These requests addressed from a remote location are coupled, via a telecommunications network 321 and modem 320 and lead 312 to an on-chip input/output port of the microprocessor device 310. The microprocessor device 310 generates an interrupt signal in response to this external inquiry and also supplies a memory display as shown in FIG. 6 to be returned via lead 312 and the modem 320 and network 321 to a display terminal at the source of the inquiry.

The microprocessor 310 generates an interrupt signal in response to the remote input command, which is routed via I/O ports 311 and lead 325 and the backplane 210 to microprocessor 201 of the master control board shown in FIG. 2. The microprocessor 201 initiates a polling action, in response to this interrupt signal, to determine which option slot from a plurality of option slots in the backplane have existing option controllers plugged in by examining the current condition of the pull up resistors on the data bus therein. If no option board is connected to a plug-in slot, the pull up resistors present a signal representative of an FF word indicating to microprocessor 201 that the slot has no option board plugged therein.

Microprocessor 310 on FIG. 3, also responds to an input command by generating a word indication of this fact which is placed at the I/O port 311 and which is sent to the I/O port 315 at a memory location in the address field of the microprocessor 201. Whenever the microprocessor 201, in performing the polling operation, finds from examining the pull up resistor states, that an option slot is occupied by an option control board, it then proceeds to examine the word in the designated address space in the I/O port 315 to determine if the interrupt signal has originated from that particular option board. If this board has initiated the interrupt signal, the program control of the microprocessor 201 jumps to the address of a program stored in the ROM memory 317 which stored program then assumes control of the master controller until it is completed or terminated. At termination of the option program control is returned to the stored program stored in ROM memory 203 on the master control board in FIG. 2.

Figure 4:
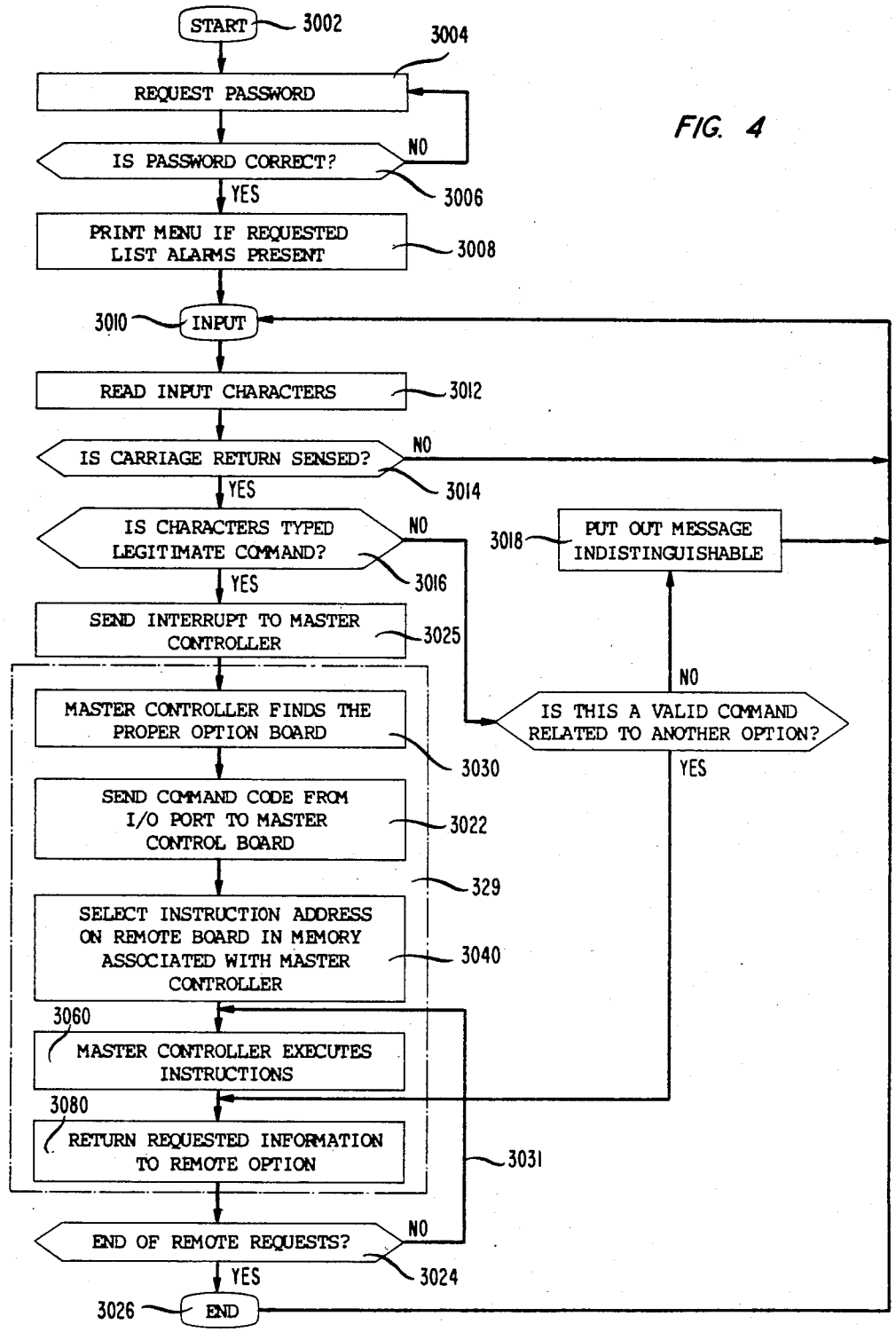

The process by which an activated option is responded to by the master controller is disclosed in the flow charts of FIGS. 4 and 5, which illustrate the stored program of a remote control option. The flow chart of FIG. 4 details an option program operative in response to a remote request from the viewpoint of the remote controller located on the option board. The program instructions are initiated in entry terminal 3002 in response to a remote call to the remote option board. It initially responds by requesting the caller to enter his password as indicated by process block 3004. The decision block 3006 operates in a loop structure that keeps checking until a valid password is input to the system by the caller. Upon acceptance of a password, the functions of process block 3008 are implemented which includes a listing of alarms that have been triggered by the battery plant and the printing of a menu of available commands which the caller may request. A typical initial display is shown in FIG. 6 and as shown gives a listing of alarms and indicates that the command 'menu' will produce a menu listing of other available commands. As shown by the illustrative example in FIG. 6 there are included several battery current and voltage alarms, major fuse alarms, a rectifier efficiency alarm, a limited recharge alarm, and other various alarms. Any of these may be printed out for clarification by typing the associated number. The subsequent menu listing was in response to the typed command 'menu'. The caller may then input command numbers as indicated by terminal input symbol 3010 to read out alarm or command letters to give him/her status results as illustrated, each of which cause the program to initiate signal measurements. The command input of menu characters or numbers is read as per process block 3012 until a carriage return is received as per decision block 3014. Once the command is accepted, the program checks to see if it is a valid command as indicated in decision block 3016. If the command is invalid; that is, it is not a valid character string recognized by the remote option in decision block 3016, the command is sent to the master controller which polls all other existing options and its own command repertory to determine if it is a legitimate command as per decision block 3017. The master controller then executes the command as per block 3015, if it is legitimate and the result is returned to the remote option as per block 3080. when the command is determined to be invalid as per decision block 3017, the message "message indistinguishing" or similar message is printed at the caller's display terminal as shown per process block 3018 and the flow of the instructions return to input terminal 3010 for the purpose of accepting a substitute command.

If the command is valid as per decision block 3016, it is converted by a table in memory to a valid instruction recognized by the microprocessor 201 of the master controller and sent thereto, as indicated in process block 3022. The portion of the flow chart enclosed by the dotted line 329 around process blocks 3022, 3030 3040, 3060, and 3080 represent instructions which are performed under control of the master controller using instructions stored in memory on the option circuit board. The master controller responds to an interrupt signal generated by the option board as per block 3025 and its response thereto, is disclosed by flow chart of FIG. 5 discussed below. The master controller responds by locating the correct option board as per block 3030. The command code is sent to the master controller as per block 3022.

The master controller receives the command code and responds by going to an address in memory located on the remote option board as per process block 3040. These instructions are executed as per process block 3060 to execute the commands originated by the remote option and the response is returned to the remote option board as indicated per process block 3080. After the response to this instruction the decision block 3024 determines if this is the end of remote requests and whether to continue proceeding with the table look up or whether the caller has entered another command. If requests continue it returns via flow line 3031 to continue executing requests and it not the program goes to terminal symbol 3026 from which it returns to input symbol to await new requests.

The program instructions disclosed in the flow chart shown in FIG. 5 is a program utilized by the master controller for determining the source of an interrupt signal that an independent activated option has sent to it. Once an interrupt signal has been received by the program as indicated by terminal block 4002, it must be determined if the interrupt has originated from an option board which operation is indicated in decison block 4004. If not, the standard processing of the master controller under the main program as per process block 4006 will suffice. If the interrupt has originated from an option, whose identity is at this point not known, the master controller sets a slot number equal to the first available option slot number in process block 4008. The program then determines per decision block 4010, if an option board occupies that slot. If not, the slot number is incremented and the next successive slot number is checked to see if it exceeds the maximum slot number representing the total number of available option slots in the system. If not, it returns to decision block 4010 to see if an option board is in the slot.

If an occupied slot is located, the program determines as per decision block 4012, if this option slot is the source of the interrupt signal. If it is not, the slot number is incremented as described above. If it is the source of the interrupt, the designated program of that option requested is run as described above. When that option process is terminated, the control is returned to the main program of the master control as indicated at terminal 4020.

Wht is claimed is:

1. A power plant control system comprising:
   master control means for monitoring the status of a power plant system,
   option acceptance means including:
   a plurality of input means for accepting independent circuit modules and coupling them to the master control means,
   each circuit module including:
   processor means for responding to an option request and alerting the master control means of an option call,
   memory means including a stored program for executing the option request and having an address recognizable to the master control means, and
   circuit connection means for coupling the memory means to the master controller.

2. In a power plant control system as defined in claim 1 wherein the processor means generates an interrupt signal in response to an option request and the circuit connection means couples the interrupt signal to the master control means, and further including
   an input/output port associated with the processor in which the processor inserts a predetermined and controlled word indicating that it is a source of the option request, and
   the master control means polls the input/output port to examine the predetermined and controlled word inserted therein in order to determine that the processor means is the origin of the interrupt signal.

3. A power plant control system as defined in claim 2 wherein each independent circuit module has memory means identified by the master controller as being at a common address.

4. A power plant control system as defined in claim 2 wherein the circuit module includes means for translating received commands into a form acceptable to the master control means.

5. A power plant control system including:
   a master control means for monitoring the status of a power plant system comprising:

a master processing unit including first associated memory means under control of the master processing unit, an option control means comprising:

an option processing unit including second associated memory means under control of the option processing unit and additional memory means in location with the option processing unit, the control system including connection means for selectively coupling the additional memory means to the master processing unit, the master control means further including:

means for polling the option processing unit in response to an interrupt signal generated by an option processing unit, means associated with the option processing unit for generating a word indicative of having initiated an interrupt and storing the word at a predetermined location, means associated with the master processing unit for accessing the predetermined location and evaluating the word, and means for having the master processing unit execute a stored program included in the additional memory means.

6. A power plant control system as defined in claim 5 wherein an apparent address to the master processing unit of the additional memory means is a common address to the master processing unit for each independent option.

7. A power plant control system as defined in claim 6 wherein the means for polling includes means for ascertaining a connection of option processing units coupled to option acceptance means.

8. A method for enabling a master controller of a power plant to respond to selected ones of a plurality of options comprising:

the steps of;

generating an interrupt signal in response to an option command and coupling it to the master controller, locating a stored program associated with each option at a common address in an address field of the master controller, executing the stored program associated with an active option by executing stored instructions at the common address of the active option.

9. A method as defined in claim 8 and further including the step of translating an option command into a form suitable for processing by the master controller.

* * * * *